United States Patent [19]

Fleischer

[11] Patent Number: 5,429,410
[45] Date of Patent: Jul. 4, 1995

[54] VEHICLE DOOR ARRANGEMENT

[75] Inventor: Stephen O. Fleischer, Bloomfield Hills, Mich.

[73] Assignee: General Motors Corporation, Detroit, Mich.

[21] Appl. No.: 151,663

[22] Filed: Nov. 15, 1993

[51] Int. Cl.$^6$ .............................................. B60J 5/04
[52] U.S. Cl. ..................... 296/146.6; 296/188; 296/189; 49/502
[58] Field of Search ................ 296/146.6, 202, 188, 296/189; 49/502, 503

[56] References Cited

U.S. PATENT DOCUMENTS

| | | | |
|---|---|---|---|
| 3,700,076 | 10/1972 | Forsting et al. | 49/502 |
| 3,868,141 | 2/1975 | Johnson | 296/146.6 |
| 5,094,034 | 3/9192 | Freeman | 49/501 |
| 5,137,325 | 8/1992 | Ohya | 296/188 |
| 5,221,121 | 6/1993 | Zichner et al. | 296/188 |

FOREIGN PATENT DOCUMENTS

4125299A1 2/1993 Germany.
4092718 3/1992 Japan .................... 296/146.6

*Primary Examiner*—Dennis H. Pedder
*Attorney, Agent, or Firm*—Ernest E. Helms

[57] ABSTRACT

An arrangement for a vehicle door is provided including first and second general vertical door supports spaced from one another in a fore and aft vehicle direction and a rigid side impact beam bridging the door supports, the beam being rigidly connected to the first beam under compressive loading, tensional loading and bending moment loading, and the beam being rigidly connected to the second beam under tensional loading and bending moment loading and the beam being slidably connected with the second support under compressive loading.

8 Claims, 1 Drawing Sheet

VEHICLE DOOR ARRANGEMENT

FIELD OF THE INVENTION

The field of the present invention is that of side impact beams for automotive vehicles.

BACKGROUND OF THE INVENTION

It is known in the art to provide a reinforcing beam in vehicle doors to protect the vehicle occupants from a side impact from other vehicles. Typically, it is highly desirable in such situations that the beam be as strong as possible at the least possible weight to provide maximum protection to the vehicle occupant from side impact. Strength of the side impact beam and door structure should be of such a magnitude that deformation of the side impact beam and the vehicle door meets the requirements for door strength in side impacts as found by a review of Federal Motor Vehicle Safety Standard (FMVSS) 214.

To provide for the protection of vehicle occupants in frontal impacts, vehicles must meet the standards of FMVSS 208 (occupant injury in 30 mph barrier test), which determines how much energy the front of the vehicle must absorb in deformation. Automotive vehicles have become more aerodynamic to help meet federally-mandated fuel economy ratings to enhance the environment. One method of achieving greater aerodynamics is lowering the from hood. Additionally, thinner sheet metal and more polymers are being utilized instead of previous heavier gauge steel. Therefore, to meet the FMVSS requirements, more energy must be absorbed in the vehicle doors.

When energy absorption additionally requires deformation of the door structure, it has been found that such energy absorption is limited by the column stiffness of the side impact beam. Therefore, it is desirable to provide a door structure having a rigid impact beam which can maximize side impact strength while at the same time allowing the door structure to absorb energy absorption mode in a frontal impact of the vehicle.

SUMMARY OF THE INVENTION

To meet the above-noted desires, the present invention is brought forth. The present invention provides a side impact beam which is constrained for bending moment, tension and compression on one of the door support structures. On the opposite door support, the beam is restrained for tension and bending moment but is not constrained in compression. The inventive door arrangement allows the door to crush and have far greater energy absorption in frontal impacts while retaining strength characteristics for side impacts.

Other advantages of the present invention will be apparent to those skilled in the art as the invention is brought forth in the accompanying drawings and detailed description.

DESCRIPTION OF THE PREFERRED EMBODIMENTS

Figure 1:
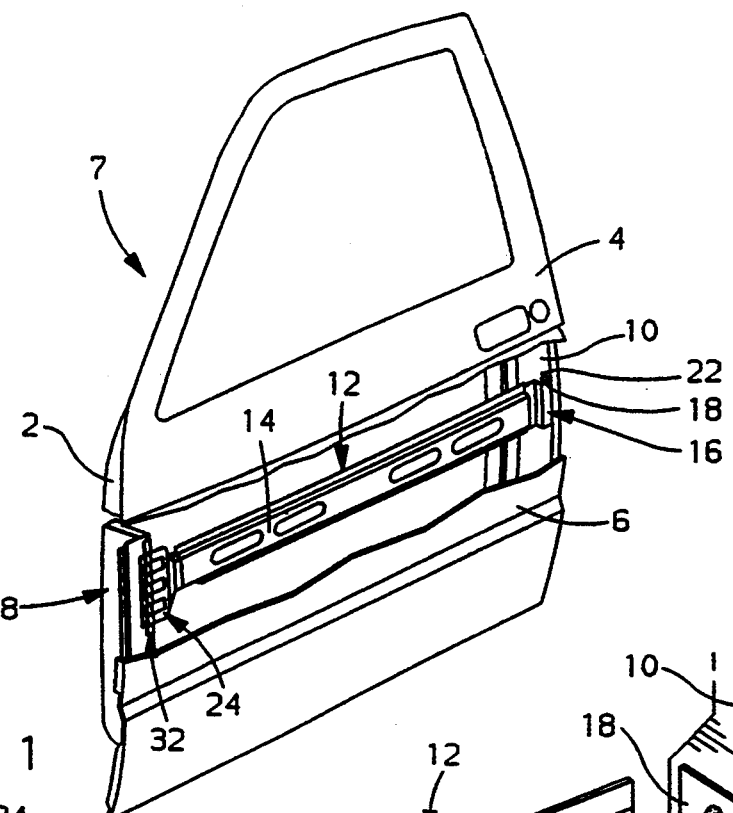
FIG. 1 is a perspective view of a preferred embodiment of the present invention with a portion of the door cut away for clarity of illustration.
Figure 2:
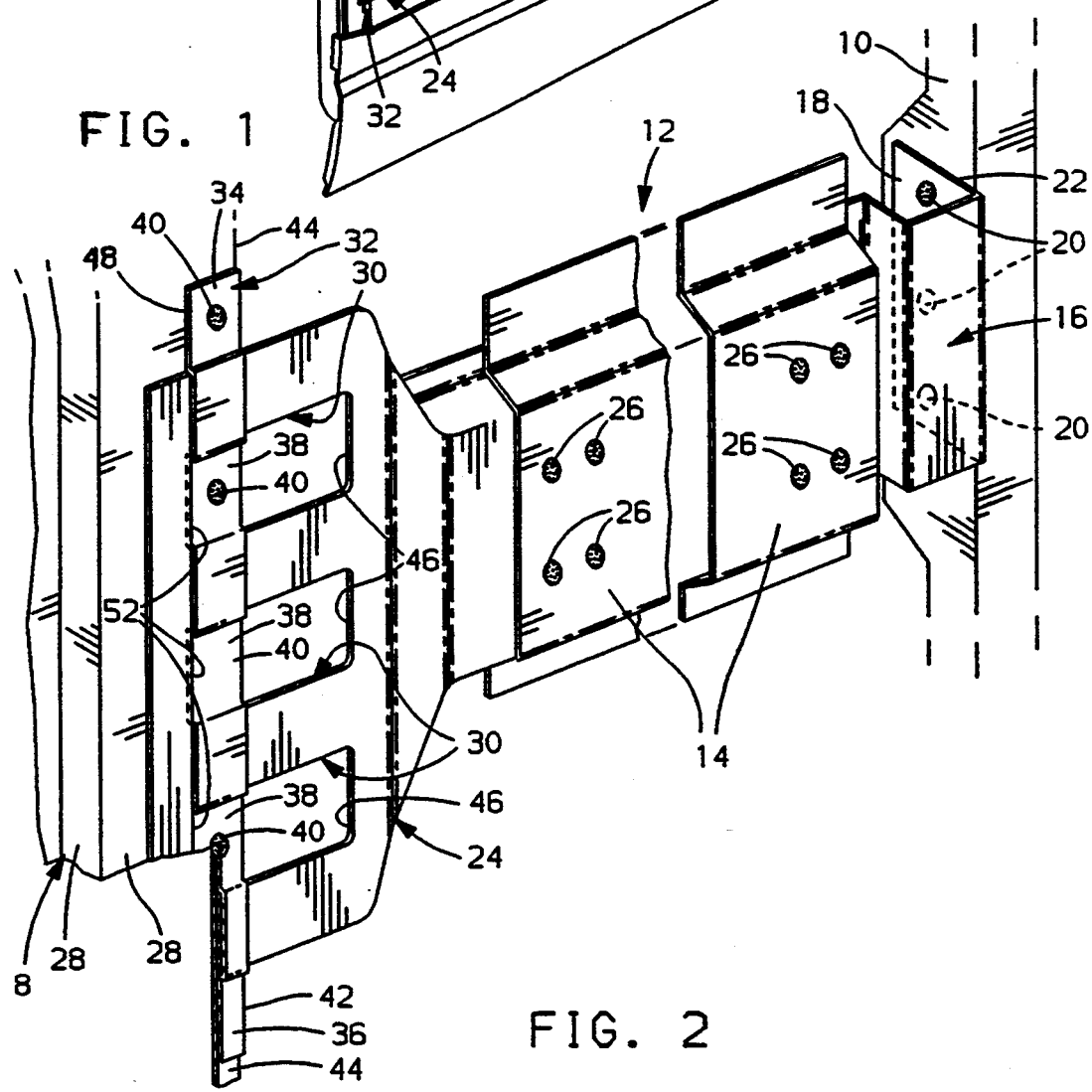
FIG. 2 is an enlarged cut-away view of a front portion of the door and side impact beam structures shown in FIG. 1.

Referring to FIGS. 1 and 2, the vehicle door 7 of the present invention has a fore or front end 2 and an aft or rear end 4. The door is covered on its outer side by an outer door panel 6. The front end 2 of the door has a front, generally vertical support 8 formed from sheet metal which has been stamped or pressed and then welded. The front support 8 will mate with the front or A pillar (not shown) of the vehicle. Spaced from the front support 8 is a generally vertical rear support 10 also formed from sheet metal which mates with the B pillar (not shown) of the vehicle.

Bridging the front support 8 and rear support 10 is a rigid side impact beam 12. The side impact beam has a central or main body portion 14, which is formed typically by two formed sheet metal pieces which are welded together. However, the present invention is not limited to such configurations of side impact beams and can be used with impact beams which are tubular or of other types of extrusions.

The main body 14 of the side impact beam is joined at a rearward first end by a dogleg 16 to the rear support 10. The dogleg 16 has a channel opening 18 to provide access for the tooling for the spot welder in order to place welds 20 in the rear member 22 of the dogleg, thereby joining the dogleg 16 with the rear support 10.

Due to the rigidity of the beam 12 and due to its connection via dogleg 16 with the rear support 10, the beam 12 is rigidly connected with the rear support 10 against any moment forces acting on the beam 12 or compression or tensional forces. Therefore, if the side impact beam 12 is struck from the side, it will exhibit full strength characteristics with respect to the rear support 10 as desired. Rigidity of the connection between the side impact beam 12 with the rear support 10 and tension is highly desirable in side impacts since, in a side impact, the side impact beam 12 will tend to pull the rear support 10 inwardly toward the middle of the door 7. The above-noted pull is then resisted by the rear support 10, adding further strength to the side impact beam 12 in order to prevent penetration of a side-impacting object or vehicle and further enhancing the protection of the vehicle occupant.

The main body 14 of the side impact beam has joined thereto at a forward second end a forward bracket 24. The bracket 24 is welded to the main body 14 at locations 26 in a conventional manner. The front support 8 has a flange portion 28 which mounts the bracket 24. The bracket 24 has three elongated longitudinal guide slots 30 cut out therefrom.

To mount the bracket 24 to the flange 28, there is a mounting strap 32. The mounting strap 32 is affixed by welding at its top end 34 and bottom end 36 with the flange 28. The strap 32 is approximately two millimeters thick and has an indented portion 38 which fits within each respective slot 30 of the bracket 24 to entwine the beam 12 with the strap 32. Additionally, each respective indention 38 is welded at point 40 to the flange 28.

In the fabrication of the door 7, a rear edge 42 of the strap 32 is always placed to line up with the rear edge 44 of the flange 28. The width of the strap 32 (as shown, 20 mm) should be of such a magnitude that the side impact beam 12 is resistant from moment forces unless there is excessive deformation of the side impact beam 12 and the front support 8. The distance of the strap from its rear edge 42 to the rear edge 46 of the aperture 30 is approximately 15 millimeters.

The interlocking of welding the strap 32 to the flange 28 within the slots 30 allows the strap to exhibit greater strength when pulled upon by a tensional force exerted by the side impact beam 12. Additionally, the interlock design allows the bracket 24 to have a high resistance to moment bending loading along the vertical axis while minimizing the weight requirement of the bracket 24. The side impact beam slot 30 also has a forward end 52 which is flush with a forward end 48 of the strap indentation and which acts as a tensional stop for the side impact beam 12.

In a side impact, the side impact beam 12 will tend to slightly deform toward the interior of the automotive, pulling on the rear support 10 and front support 8. The pulling force, as mentioned previously, will cause the front surface 52 of the slot 30 to pull in on the forward end 48 of the strap indentation. Since the strap 32 is welded within at least two of the slots 30 at the indented portions 38, the thickness of the strap 32 can be lower than it would normally be if it relied upon only being affixed with the flange 28 of the front support 8. In the case of a frontal impact, the side impact beam 12 would tend to have slippage with respect to the strap 32 of up to 15 millimeters, thereby allowing the door arrangement 7 to crush at a lower force level and hence act as an energy absorption means without being strengthened by the side impact beam 12.

Another advantage of the present invention is that on frontal 30 degree angular impacts, the side impact beam is allowed full slippage to where a rear surface 42 of the strap mates with the rear surface of the slot 30, allowing energy absorption characteristics of the door to occur initially, and thereafter will bottom out by the rear edge 46 of the strap acting as a compressional force stopping means with the rear end 46 of the aperture 30. The above action allows the side impact beam 12 to then again add stiffness and rigidity to the door arrangement 7. These absorption and stiffening characteristics have been found to be beneficial for angular frontal impacts.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An arrangement for a vehicle door comprising:
   first and second general vertical door supports spaced from one another in a fore and aft vehicle direction;
   a rigid side impact beam bridging the door supports, the beam having a first end being rigidly connected to the first support under compressive loading, tensional loading and bending moment loading, and the beam having a second end being rigidly connected to the second support under tensional loading and bending moment loading and the beam second end being slidably connected with the second support under compressive loading.

2. An arrangement for a vehicle door as described in claim 1 wherein the second support is on a fore end of the door..

3. An arrangement for a vehicle door as described in claim 1 wherein the beam has a longitudinal guide and wherein a strap fitted with the door provides a tensional stop means with the beam and wherein the beam is entwined with the strap.

4. An arrangement for a vehicle door as described in claim 3 wherein the strap also provides a compressive stop means with the beam.

5. An arrangement for a vehicle door as described in claim 3 wherein the strap is affixed to the second support above and below the beam and wherein the beam longitudinal guide includes a longitudinal slot and wherein the strap is affixed to the second support within the longitudinal slot of the beam.

6. An arrangement for a vehicle door as described in claim 4 wherein the beam has at least two said longitudal guides.

7. An arrangement for a vehicle door comprising:
   first and second generally vertical door supports spaced from one another in a fore and aft vehicle direction:
   a rigid side impact beam bridging the door supports, the beam having a first end being rigidly connected to the first support under compressive loading and tensional loading and bending moment loading, the beam having a second end being rigidly connected to the second support under tensional and bending moment loading, and the beam second end having at least two longitudinal slots and being supported for sliding movement in compression with the second support under compressive loading by a strap affixed with the second support above and below the beam second end, the strap being affixed with the second support inside the longitudinal slots of the beam second end.

8. A door arrangement as described in claim 6 wherein the strap is affixed to the second support by welding.

* * * * *